United States Patent [19]

Ota

[11] Patent Number: 5,005,929
[45] Date of Patent: Apr. 9, 1991

[54] APPARATUS INCLUDING A LASER SCANNER

[75] Inventor: Kazuo Ota, Kanagawa, Japan

[73] Assignee: Kabushiki Kaisha Komatsu Seisakusho, Tokyo, Japan

[21] Appl. No.: 364,448

[22] PCT Filed: Jul. 30, 1987

[86] PCT No.: PCT/JP87/00568

§ 371 Date: Feb. 15, 1989

§ 102(e) Date: Feb. 15, 1989

[87] PCT Pub. No.: WO88/01396

PCT Pub. Date: Feb. 25, 1988

[30] Foreign Application Priority Data

Aug. 18, 1986 [JP] Japan .................. 61-192541

[51] Int. Cl.$^5$ .............................. G02B 26/10
[52] U.S. Cl. ...................... 350/6.5; 350/6.1;
318/127; 250/238; 73/497
[58] Field of Search .............. 350/6.6, 6.1, 6.91,
350/255, 486, 487, 6.5; 250/234, 236, 238;
73/497; 318/127, 119; 358/75, 80, 461

[56] References Cited

U.S. PATENT DOCUMENTS

| | | | |
|---|---|---|---|
| 3,782,205 | 1/1974 | Fletcher et al. | 73/497 |
| 4,370,019 | 1/1983 | Shirasaki | 350/6.6 |
| 4,408,490 | 10/1983 | Takahashi et al. | 73/497 |

FOREIGN PATENT DOCUMENTS

| | | |
|---|---|---|
| 587122 | 7/1980 | Japan . |
| 137158 | 10/1981 | Japan . |
| 997786 | 6/1984 | Japan . |
| 197818 | 11/1984 | Japan . |
| 210318 | 9/1986 | Japan . |
| 235091 | 10/1986 | Japan . |

Primary Examiner—Bruce Y. Arnold
Assistant Examiner—Loha Ben
Attorney, Agent, or Firm—Diller, Ramik & Wight

[57] ABSTRACT

The present invention provides an apparatus including a laser scanner wherein the apparatus further includes a scanner temperature detector (3) located in the proximity of a position sensor (2), an environment temperature detector (4) and temperature controlling mechanism adapted to perform controlling operation so as to allow the temperature of the position sensor to be kept constant on the basis of an output from the environment temperature detector and an output from the scanner temperature detector. Further, the present invention provides an apparatus including a laser scanner wherein the apparatus further includes a scanner temperature detector (3) for detecting the temperature of the position sensor, a table setting mechanism for setting a data correction table while a positional deviation caused by variation in temperature has been previously detected and a scanner controlling mechanism (16) for controlling the driving of a scanner on the basis of a value of correction derived from referring of a value detected by the scanner temperature detector to the data correction table.

2 Claims, 6 Drawing Sheets

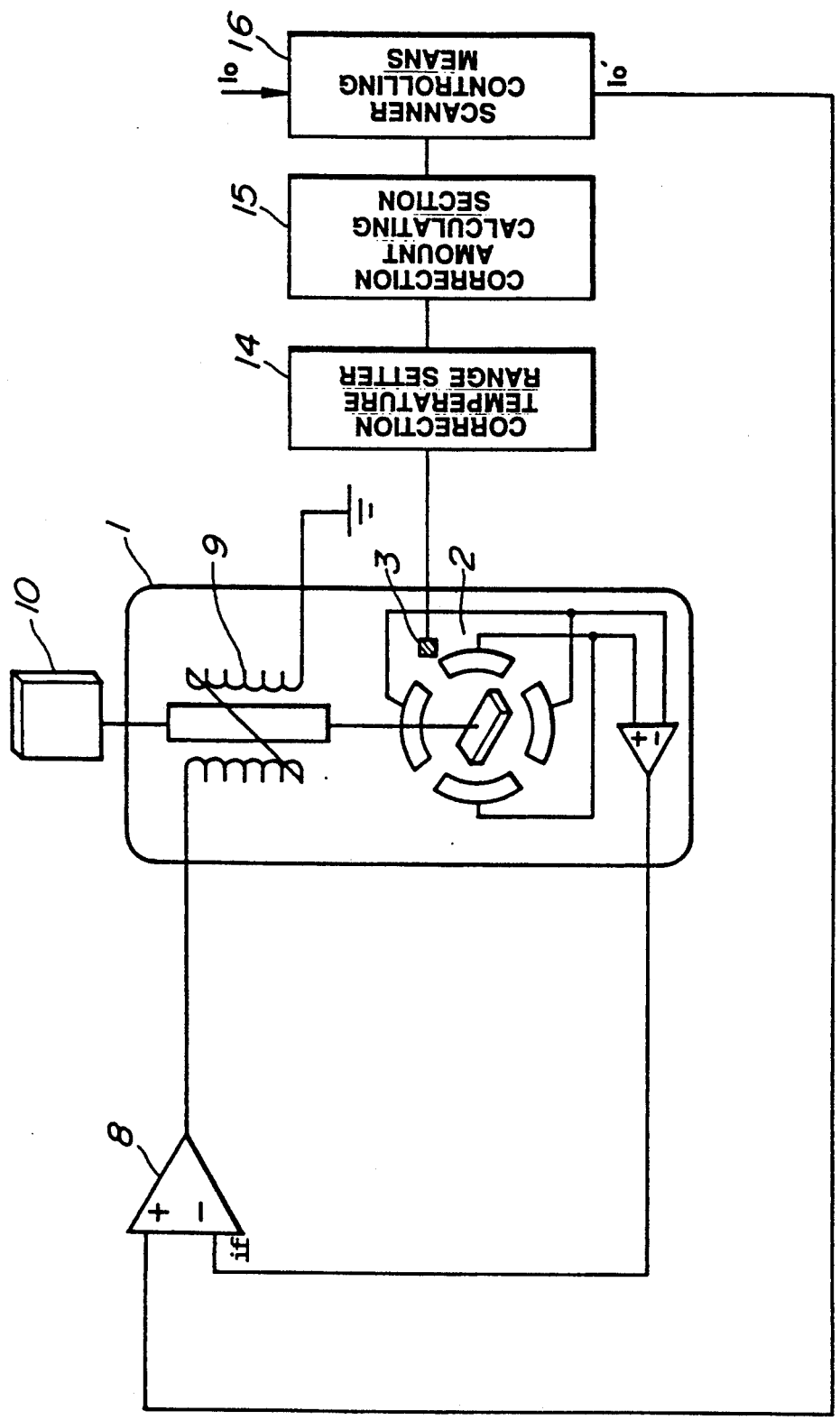

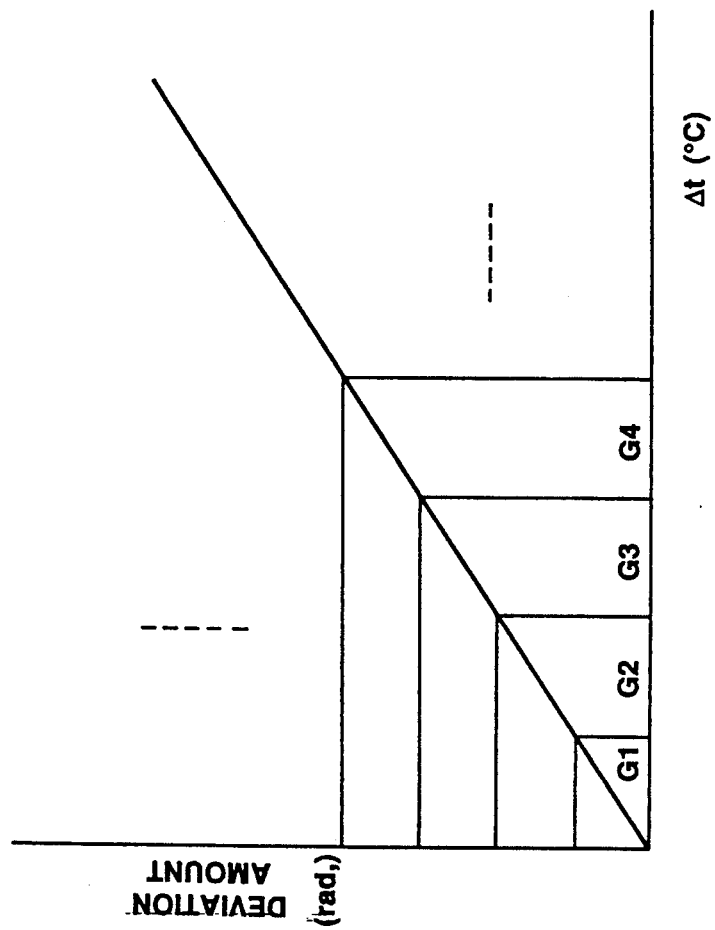

APPARATUS INCLUDING A LASER SCANNER

FIELD OF THE INVENTION

The present invention relates to an apparatus including a laser scanner and more particularly to a function for preventing a positional deviation of the apparatus with respect to a machining position of the latter, the positional deviation being caused by variation in temperature of an environment temperature and variation in temperature of a scanner appearing as the apparatus is used.

DESCRIPTION OF THE RELATED ART

As the semiconductor technology is advanced, a variety of elements produced of semiconductor are miniaturized more and more so that a requirement for improvement of the current fine machining technique has been raised up.

Particularly, the laser machining technique has the following advantageous features compared with mechanical machining, electronic machining and chemical machining each of which has been hitherto employed.

(1) It can obtain a very high density of output power.

(2) Since it is non-contact machining, distortion and deformation of a workpiece as seen after completion of machining compared with its state before machining can be suppressed to a minimized level.

(3) It is possible to perform local machining.

(4) Machining can be performed in an arbitrarily selected atmosphere. (Since there is no need of allowing the workpiece to be placed in vacuum, it can be performed at an inexpensive cost compared with the conventional electron beam machining.) In view of the above-mentioned advantageous features, the laser machining has been widely employed in many utilization fields such as marking on the very fine part of a workpiece, trimming of thick film or thin film resistance, annealing of semiconductor and so forth.

An important consideration to be taken during a step of laser machining is to control the position where a laser beam is radiated. To this end, a scanner for which a laser beam is used (hereinafter referred to as a laser scanner) adapted to perform the positional controlling by actuating a mirror is usually used.

This laser scanner is a device which is provided with a position sensor 2 as shown, for example, in FIG. 4 so that the position where a laser beam is radiated is controlled by actuating a mirror 10 by means of a magnetic driver 9 on the basis of positional data detected by the position sensor 2.

With respect to the conventional laser scanner, to assure that positional controlling is exactly performed for the axis of the scanner, there is a need of setting a strict operative condition. Especially, when a laser beam is practically radiated in a factory shop, it is required that its temperature property is particularly stabilized. This is because of the fact that it is required that operation is performed under an environmental condition which could not be presumed by anybody as far as the experimental level is concerned.

To assure that the temperature property is stabilized, such a method that a heater H is arranged round a position sensor 2 in a scanner 1 as shown in FIG. 5 so that the position sensor section is heated up to and maintained at a temperature of about 40° C. at all times by controlling the temperature of an electric power supply source to which the heater H is connected is employed for a laser scanner manufactured, e.g., by General Scanning Corp. (U.S.A.). FIG. 6 illustrates a relationship between a laser scanner b of the type including a heater for the purpose of heating and temperature maintaining and a standard type laser scanner a without any heater used therefor, with respect to temperature and time. As is apparent from the drawing, the laser scanner of the first-mentioned type has an advantageous feature that an operating temperature can be stabilized more reliably than the standard type laser scanner but it has been found that it has the following problems.

(1) It has an elongated period of running time (30 minutes).

(2) The environment temperature required for operation of the laser scanner is restricted in the range of 10° to 28° C.

(3) It is problematic from the viewpoint of environment and practical installation that it is employed on the general industrial base because of the problems as mentioned in the preceding paragraphs (1) and (2).

(4) Since controlling is performed for a quantity of heat generated by the heater, it has a slow responsiveness to variation in temperature of the environment and moreover a drift can not be suppressed completely.

The present invention has been made with the foregoing background in mind and its object resides in providing an apparatus including a laser scanner which assures that positional-controlling can be performed for the axis of a scanner with high accuracy without any occurrence of temperature drift irrespective of variation in temperature of the scanner.

SUMMARY OF THE INVENTION

To accomplish the above object, the present invention provides an apparatus including a laser scanning usable for the purpose of controlling the position where a laser beam is radiated (representative of the direction of scanning by turning a mirror by driving means adapted to be actuated in response to a signal detected by a position sensor, wherein the apparatus further includes a scanner temperature sensor located in the proximity of the position sensor and controlling means for compensating the temperature of the position sensor on the basis of an output from the scanner temperature sensor whereby operation of the driving means is controlled by the controlling means.

The controlling means is constructed, e.g., such that it is provided with environment temperature detecting means for detecting a scanner atmosphere, i.e., an environment temperature to compare the environment temperature with the temperature of the position sensor section at all times and the position sensor section is heated or cooled by driving heating/cooling means in dependence on results derived from the foregoing comparison so that the temperature of the position sensor section is maintained constant at all times.

Further, as other example, the controlling means is so constructed that it includes setting means adapted to set a data correction table while a positional deviation caused by variation in temperature has been previously detected and means for controlling the driving of a scanner on the basis of the data correction table and a value detected by the scanner temperature sensor.

With respect to an example of the aforementioned examples where controlling means including environment temperature detecting means is used, since variation in temperature of the scanner due to the environment temperature and the frequency of usage is compensated by the heating/cooling means so that the temperature of the scanner is kept constant at all times, this causes the range of an operation temperature to be widened so that positional controlling can be performed with high accuracy to properly respond to any rapid variation of temperature.

In addition, according to another example of the aforementioned examples, correction values $\Delta Xm$ and $\Delta Ym$ in n stages represented by G1 to Gn has been previously set by a number of experiments, e.g., in dependence on a required degree of accuracy, as shown in FIG. 3(b) and the following table. In FIG. 3(b), an ordinate represents an amount of deviation (rad.) and an abscissa does a value of increase in the temperature of the scanner from the initial value. A deviation ($\Delta t$) from the initial temperature is calculated on the basis of a value detected by the scanner temperature sensor so that a stage Gm corresponding to the calculated deviation is determined.

Then, correction positions are obtained in accordance with equations (1) and (2) selected from the following table to correspond to the central values at the stage Gm which has been determined in that way.

$$X = Xo + \Delta Xm \quad (1)$$

$$Y = Yo + \Delta Ym \quad (2)$$

(where Xo and Yo represent coordinates detected by the position sensor.) Then, the mirror is driven in dependence on the obtained correction positions. Since this method is practiced in such a manner that correction is made on the basis of variation in temperature of the scanner, it is possible to radiate a laser beam with a high positional accuracy.

TABLE

|    | X | Y |
|----|---|---|
| G1 | Xo + $\Delta$X1 | Yo + $\Delta$Y1 |
| G2 | Xo + $\Delta$X2 | Yo + $\Delta$Y2 |
| G3 | Xo + $\Delta$X3 | Yo + $\Delta$Y3 |
| G4 | Xo + $\Delta$X4 | Yo + $\Delta$Y4 |
| ⋮  | ⋮ | ⋮ |
| Gm | Xo + $\Delta$Xm | Yo + $\Delta$Ym |
| ⋮  | ⋮ | ⋮ |
| Gn | Xo + $\Delta$Xn | Yo + $\Delta$Yn |

BRIEF DESCRIPTION OF THE DRAWINGS

FIG. 3(a) is a schematic view illustrating an apparatus including a laser scanner in accordance with a second embodiment of the present invention.

FIG. 3(b) is a diagram illustrating a relationship between differential temperature and amount of deviation.

DESCRIPTION OF THE PREFERRED EMBODIMENT

Now, the present invention will be described in a greater detail hereinafter with reference to the accompanying drawings which illustrate preferred embodiments thereof.

Figure 1:
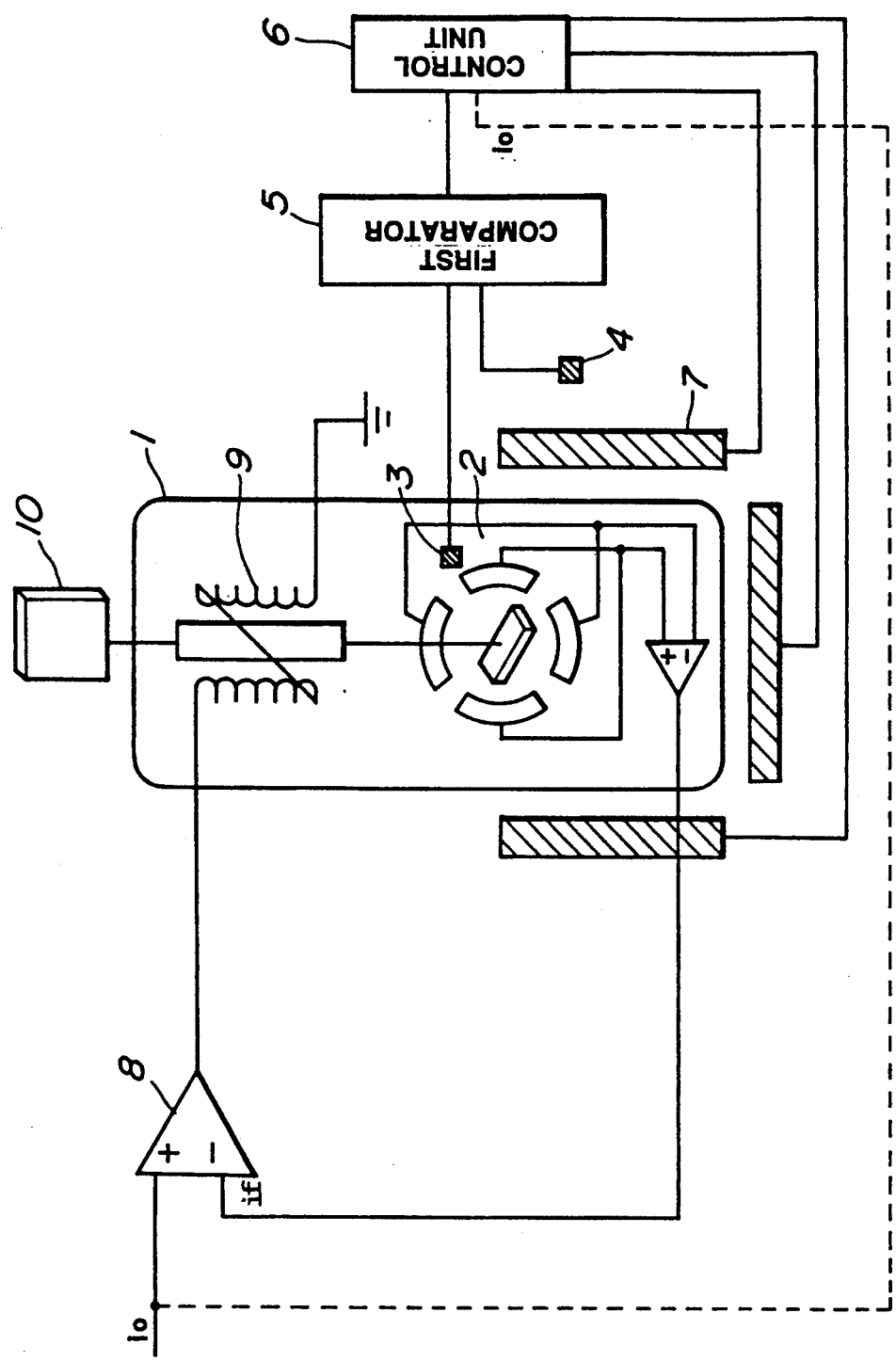
FIG. 1 is a schematic view illustrating an apparatus including a laser scanner in accordance with a first embodiment of the present invention.

FIG. 1 is a schematic view illustrating a laser scanner including a laser scanner in accordance with a first embodiment of the present invention.

The apparatus has a characterizing feature which consists in that it includes a scanner temperature sensor 3 located in the proximity of a scanner position sensor 2 in a scanner 1, an environment temperature sensor 4 adapted to detect the environment temperature, a first comparator 5 for comparing a value detected by the temperature sensor 3 with a value detected by the temperature sensor 4, a control unit 6 for controlling the temperature of the scanner position sensor 2 on the basis of an output from the first comparator 5 and an intensity of electric current indicative of a positional command to be inputted therein as a command monitoring signal and a heating/cooling unit 7 comprising a Peltier element to heat or cool the scanner position sensor 2 in response to a command from the control unit 6.

Figure 4:
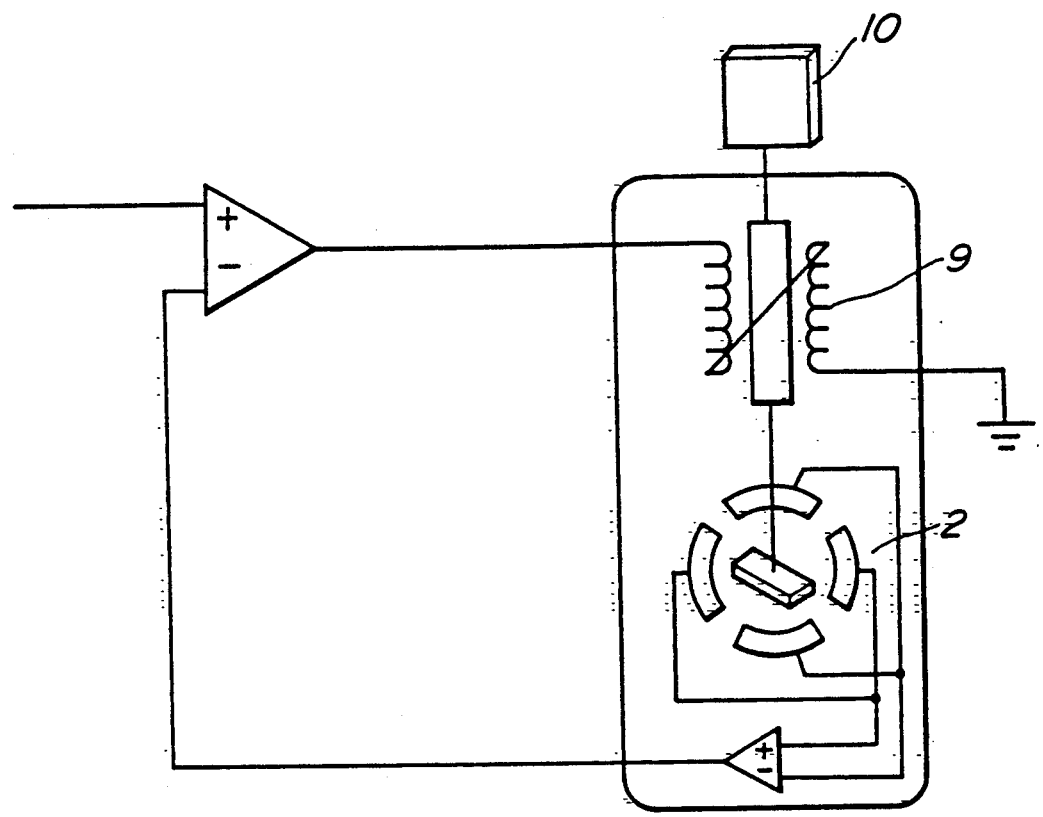
FIGS. 4 and 5 are each a schematic view illustrating a conventional apparatus including a laser scanner respectively.
Figure 5:
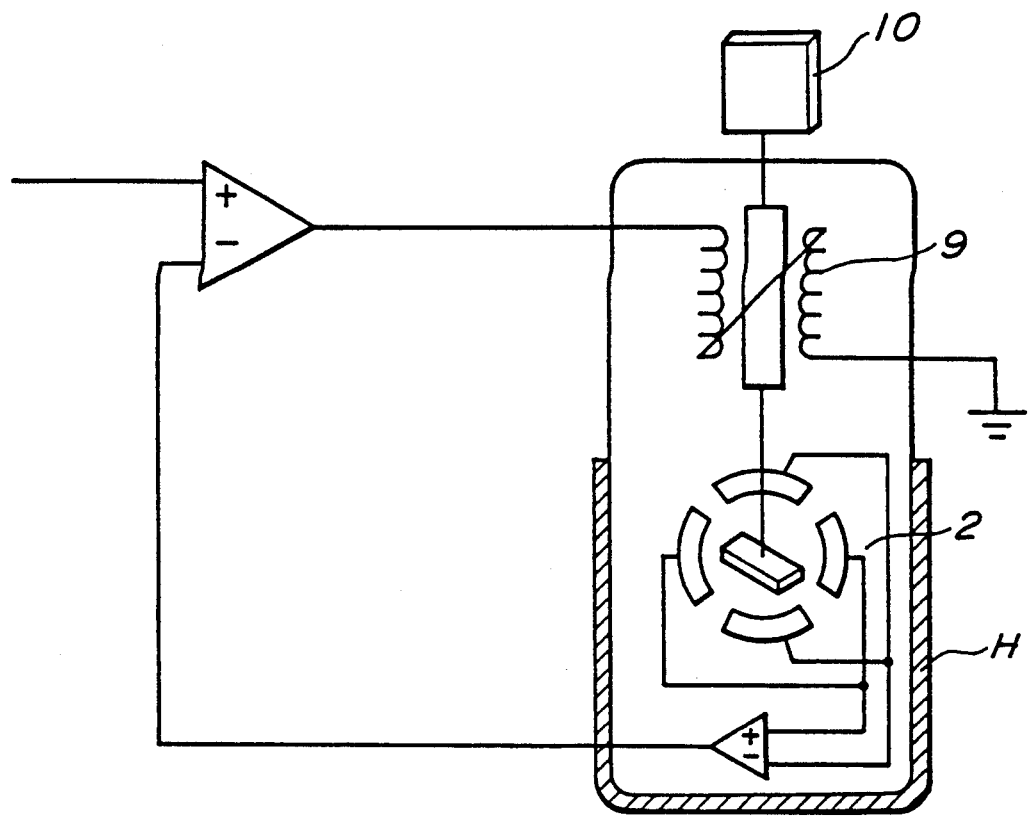
Figure 6:
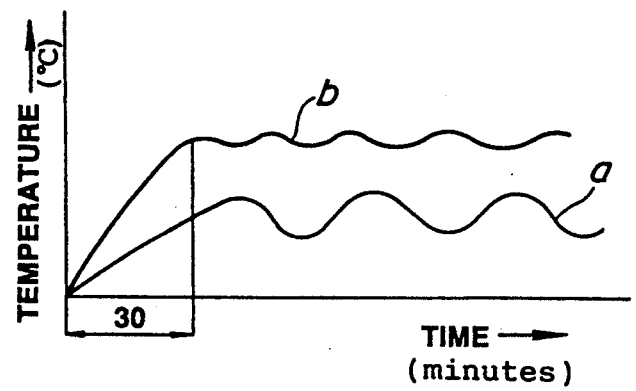
FIG. 6 is a diagram illustrating a relationship between time and temperature with respect to the laser scanners shown in FIGS. 4 and 5.

Since other components constituting the apparatus exclusive those as mentioned above are substantially identical to those for the conventional apparatus as shown in FIG. 4, same or similar components to those in FIG. 4 are identified by same reference numerals. In FIG. 1, reference numeral 8 designates a second comparator for comparing a feedback signal $i_f$ from the scanner position sensor 2 with a positional command signal $i_o$ to be inputted in the control unit 6 so as to output a driving electric current to a magnetic driver 9 and reference numeral 10 designates mirror adapted to be turned by the magnetic driver 9.

Next, operation of the apparatus will be described in the following.

First, when a position command signal $i_o$ indicative of the existent position is inputted in the second comparator 8, the latter compares the positional command signal $i_o$ with a feedback signal $i_f$ from the position sensor 2 so that a driving electric current $\Delta i$ is fed to the magnetic driver 9 on the basis of results derived from the above comparison. This causes the mirror 10 to be turned in response to turning moment of the scanner 1 by a predetermined quantity.

On the other hand, the positional command signal $i_o$ is inputted in the control unit 6 as a command monitoring signal.

Then, a command signal is issued to the heating/cooling unit 7 from the control unit 6 with reference to the results derived from the comparison of an output from the scanner temperature detector 3 with an output from the environment temperature detector 4 in the presence of the first comparator 5 as well as the aforementioned command monitoring signal whereby controlling is performed so as to allow the temperature of the scanner position sensor section 2 to be kept constant at all times.

Figure 2:
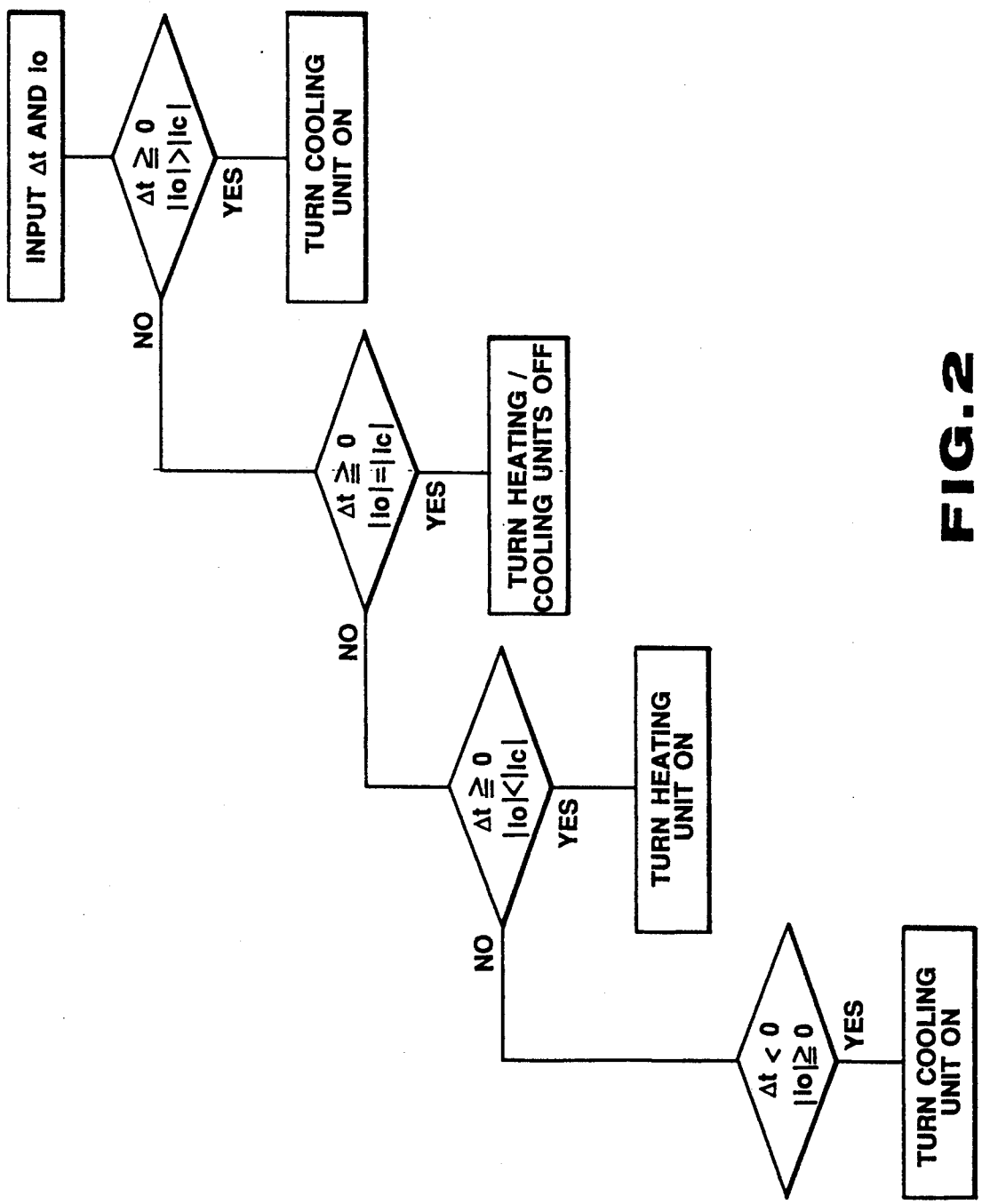
FIG. 2 is a flowchart illustrating operations of the control unit used for the apparatus in FIG. 1.

FIG. 2 is a flowchart which illustrates by way of example operations of the control unit 6. Here, when it is assumed that $T_1$ designates a temperature detected by the scanner temperature detector 3, $T_2$ does a temperature detected by the environment temperature detector 4, $\Delta t$ does $T_1 - T_2$ and $i_c$ does a command electric current of which intensity is determined so as to set a condition as identified by $\Delta t = 0$.

With the apparatus constructed in the above-described manner, the temperature of the position sensor section and the environment temperature are continuously detected so that controlling is performed in dependence on values of the temperatures so as to allow the temperature of the position sensor section to be kept constant at all times. This makes it possible to properly control with high accuracy at all times the position where a laser beam is radiated, irrespective of how rapidly these temperatures vary.

Incidentally, the present invention has been described above as to the embodiment wherein a Peltier element is employed for the heating/cooling unit. However, the present invention should not be limited only to this. Alternatively, the apparatus may be suitably changed or modified to an apparatus of the type including an electrical heater and a cooling fan in combination, an apparatus of the type using pure water or liquid having a high degree of electrical insulation as a heat conducting medium or the like apparatus.

Next, description will be described below as to a second embodiment of the present invention.

FIG. 3(a) is a schematic view illustrating an apparatus including a laser scanner in accordance with the second embodiment.

The apparatus is so constructed that a differential temperature is previously divided into a plurality of stages G1-Gn as shown in FIG. 3(b), the differential temperature and an amount of deviation corresponding to the latter are stepwise calculated for the respective stages G1-Gn in such a manner as shown in the foregoing table and the temperature of the position sensor is continuously detected so that data indicated by the position sensor are properly corrected by monitoring what stage among the stages G1-Gn is assumed by the differential temperature. Thus, the apparatus has a characterizing feature which consists in that it includes a scanner temperature detector 3 located in the proximity of a scanner position sensor 2 in the scanner 1, a correction temperature range setter 14 adapted to calculate a difference $\Delta t$ between the detected temperature and the present reference temperature and determine to what stage among the preset stages G1-Gn a value derived from the above calculation corresponds, a correction amount calculating section 15 for calculating an amount of correction in dependence on an output from the correction temperature range setter 14 and scanner controlling means 16 for controlling correction of a signal $i_o$ indicative of a positional command on the basis of an output from the correction amount calculating section 15.

Other components constituting the apparatus are substantially identical to those in the first embodiment. Thus, components having the same function as those in the first embodiment are identified by same reference numerals.

By using the aforementioned means, the signal $i_o$ indicative of a positional command issued on the basis of printing data is continuously corrected in response to variation in temperature of the position sensor and a driving electric current is fed to the magnetic driver 9 on the basis of results derived from a comparison made between printing data $i_o$ after correction and a feedback signal $i_f$ from the scanner position sensor whereby the mirror 10 is turned by turning movement of the scanner 1.

Here, it is assumed that an amount of deviation at the central value of the temperature range at a certain stage Gm is added to the initial data by the scanner controlling means.

The apparatus as constructed in the above-described manner assures that an amount of drift relative to the initial data provided by the X/Y scanner as the latter has an increased temperature is calculated so that the drift is properly corrected so as to allow a value of the command signal to be kept constant within the preset temperature range. This makes it possible to very easily perform fine machining with high accuracy.

It should be added that if the differential temperature is finely divided into more stages, an accuracy can be improved much more while it is less affected by the drift. Accordingly, it suffices that a number of stages are adequately selected in correspondence to a required accuracy. Thus, it is possible to easily perform proper positional setting in correspondence to a degree of requirement.

I claim:

1. An apparatus including a laser scanner usable for the purpose of controlling the position of a mirror where a laser beam is reflected (representative of the direction of scanning) by turning said mirror by driving means adapted to be actuated in response to a signal indicative of a positional command and a signal detected by a position sensor, wherein said apparatus further includes;

scanner temperature detecting means for detecting the temperature of said position sensor, environment temperature detecting means for detecting the environment temperature and temperature controlling means adapted to perform controlling operation so as to allow the temperature of the position sensor to be kept constant at all times on the basis of an output from said environment temperature detecting means and an output from said scanner temperature detecting means whereby operation of said driving means is controlled by said temperature controlling means.

2. An apparatus including a laser scanner usable for the purpose of controlling the position of a mirror where a laser beam is reflected (representative of the direction of scanning) by turning said mirror by driving means adapted to be actuated in response to a signal indicative of a positional command and a signal detected by a position sensor, wherein said apparatus further includes;

scanner temperature detecting means for detecting the temperature of said position sensor, correction temperature range setter means for generating a temperature differential between the temperature detected by said scanner temperature detecting means and a preset reference temperature, correction amount calculating means responsive to said temperature differential for generating a correction signal, and drive controlling means for controlling the driving of said scanner on the basis of said correction signal.

* * * * *